(12) United States Patent
Eo et al.

(10) Patent No.: US 12,423,062 B1
(45) Date of Patent: Sep. 23, 2025

(54) AI-BASED APPLICATION BUILD AND DEPLOYMENT SUPPORT SYSTEM AND METHOD

(71) Applicant: INSWAVE SYSTEMS CO., LTD., Seoul (KR)

(72) Inventors: Se Yong Eo, Seoul (KR); Woog Lae Kim, Seoul (KR)

(73) Assignee: INSWAVE SYSTEMS CO., LTD., Seoul (KR)

( * ) Notice: Subject to any disclaimer, the term of this patent is extended or adjusted under 35 U.S.C. 154(b) by 0 days.

(21) Appl. No.: 19/090,291

(22) Filed: Mar. 25, 2025

(30) Foreign Application Priority Data

Mar. 25, 2024 (KR) ......................... 10-2024-0040189

(51) Int. Cl.
| | | |
|---|---|---|
| *G06F 40/40* | (2020.01) | |
| *G06F 8/30* | (2018.01) | |
| *G06F 8/60* | (2018.01) | |
| *G06F 9/445* | (2018.01) | |
| *G06F 9/455* | (2018.01) | |
| *G06F 16/242* | (2019.01) | |
| *G06F 16/332* | (2025.01) | |
| *G06F 21/64* | (2013.01) | |

(52) U.S. Cl.
CPC . *G06F 8/30* (2013.01); *G06F 8/60* (2013.01)

(58) Field of Classification Search
CPC ..... G06F 8/30; G06F 8/60; G06F 8/35; G06F 40/103; G06F 40/166; G06F 8/34; G06F 8/38; G06F 40/143; H04L 51/04; H04L 51/046; H04L 51/56; H04L 51/216
See application file for complete search history.

(56) References Cited

U.S. PATENT DOCUMENTS

| | | | |
|---|---|---|---|
| 11,893,358 B1 * | 2/2024 | Lakshmikanthan | ... G06N 20/00 |
| 12,254,029 B1 * | 3/2025 | Veillon | ............... G06F 16/248 |

FOREIGN PATENT DOCUMENTS

| | | |
|---|---|---|
| KR | 10-2013-0017337 A | 2/2013 |
| KR | 10-2019-0079791 A | 7/2019 |
| KR | 10-2020-0013915 A | 2/2020 |
| KR | 10-2284539 B1 | 8/2021 |
| KR | 10-2021-0125742 A | 10/2021 |
| KR | 10-2024-0020994 A | 2/2024 |
| KR | 10-2645660 B1 | 3/2024 |

* cited by examiner

*Primary Examiner* — Thuy Dao
(74) *Attorney, Agent, or Firm* — IP & T GROUP LLP

(57) ABSTRACT

AI-based application build and deployment support system and method are disclosed. The AI-based app build and deployment support method when executed by a computer includes classifying a user query into a corresponding one of a plurality of categories, generating a context for the user query, generating a LLM prompt by calling a service module according to the category and adding the context to a service-specific prompt provided by the service module, querying the LLM prompt through an LLM interface to a LLM and receiving a response thereto, and providing the response to the chat client as a response to the user query after validating the response.

9 Claims, 17 Drawing Sheets

FIG. 11

User Q: I want to create an Android project in W-Hive.
Chatbot A: I will create an Android project in W-Hive. (0/8)

Chatbot A: Please enter the project name (0/8):
User Q: DemoApp

Chatbot A: Would you like to create a project using W-Matrix? Would you like to upload a general Android project? (1/8)
User Q: I will create it using W-Matrix.

Chatbot A: Please select the development language. (2/8)
1.   Kotlin      2.   Java
User Q: 1

Chatbot A: Please enter the project directory name. (3/8)
User Q: Demo

Chatbot A: Please select the build server profile. (4/8)
1.   BuildServer1 profile
2.   BuildServer2 profile
User Q: 1

Chatbot A: Please select the version control system profile. (5/8)
1.   local-git profile
2.   local-svn profile
3.   github profile
User Q : 1

Chatbot A: Please select a deployment server profile. (6/8)
1.   local profile
2.   ftp profile
User Q: 2

Chatbot A: Please enter a project description. (7/8)
User Q: Demo app

Action example 1/3

FIG. 12

Chatbot A: The input for project creation is complete. Next, please enter the app information.
Please enter the Application ID. (0/7)
User Q: com.inswave.demo Chatbot A: Please enter the AppName (1/7)
User Q: DemoApp Chatbot A: Please enter the AppVersion (2/7)
User Q: 1

Chatbot A: AppVersion is not appropriate. Please refer to the example and enter it again.
Example) 1.0.0 (2/7)
User Q: 1.0.0

Chatbot A: Please enter the AppVersionCode (3/7)
User Q: 1

Chatbot A: Please enter the Package Name (4/7)
User Q: com.inswave.demo

Chatbot A: Please enter the minimum OS supported version (5/7)
Currently, the minimum OS supported version of W-Matrix is Android 6.0.
User Q: Android 7.0

Chatbot A: Would you like to upload an App Icon? (6/7)
1. Upload
2. Create Icon
User Q: 2

Action example 2/3

FIG. 13

Chatbot A: I have some additional questions for creating an App Icon.
Please enter the string to be used in the icon. If not, please press Enter.
User Q: It's annoying, so make it a bright and colorful icon.

Chatbot A: Okay, I understand. I created 4 images. Please select the image you want.
1. Image A
2. Image B
3. Image C
4. Image D
User Q: 1

Chatbot A: Please enter the W-Matrix server information in order.
1. Server name:
2. App ID:
3. Server address:
User Q:
Release, inswave.wmatrix.demo, https://mre.inswave.kr Chatbot A: I have entered all the app information.

If the input information below is correct, I will create the project.
1. Create
2. Modify
3. End creation ------------- Input information -------------------
Project name: DemoApp
Product name: W-Matrix for Mobile
Platform: Android
......
------------------------------------------------

User Q: 1
ChatBot A: Creating project ))))))))))

Chatbot A: The project has been created. The following actions are possible. Please select.
1. Add W-Matrix plugin
2. Deployment settings
3. Build app
4. Created project settings
5. End chat Action example 3/3

FIG. 14

User Q: What is W-Hive?
Chatbot A: W-Hive is a mobile app build/deployment solution created by InsWave. It also provides the ability to create W-Matrix for Mobile projects and add/remove plug-ins. It builds Android and iOS apps and supports deployment to the AppStore or in-house deployment.

Chat example

FIG. 15

> User Q:
> Prepare build
> note: Building targets in dependency order
> Building targets in dependency order
> Computing target dependency graph and provisioning inputs
> Create build description
> Build description signature: 47c597853b183d8232fb7edccf5c9502
> Build description path:
> /Users/jihoonjang/Library/Developer/Xcode/DerivedData/Template-aycecsozcnuceugoic
> mshirkordo/Build/Intermediates.noindex/XCBuildData/47c597853b183d8232fb7edccf5c9
> 502.xcbuilddata
>
> Build target Template of project Template with configuration Debug
> /Users/jihoonjang/W-Matrix-iOS/WMatrix/Template/Template.xcodeproj: error:
> Provisioning profile "SooRinTest" has app ID "inswave.whive.soorintest", which does not
> match the bundle ID "inswave.whive.soorintest2". (in target 'Template' from project
> 'Template')
> warning: Run script build phase 'Run Script' will be run during every build because it does
> not specify any outputs. To address this warning, either add output dependencies to the
> script phase, or configure it to run in every build by unchecking "Based on dependency
> analysis" in the script phase. (in target 'Template' from project 'Template')
>
> /Users/uapmobile/W-Matrix-iOS/WMatrix/Template/Template.xcodeproj: Provisioning
> profile "SooRinTest" has app ID "inswave.whive.soorintest", which does not match the
> bundle ID "inswave.whive.soorintest2".
> Run script build phase 'Run Script' will be run during every build because it does not
> specify any outputs. To address this warning, either add output dependencies to the script
> phase, or configure it to run in every build by unchecking "Based on dependency analysis"
> in the script phase.
>
> ChatBot A: error: Provisioning profile "SooRinTest" has app ID "inswave.whive.soorintest",
> which does not match the bundle ID "inswave.whive.soorintest2". There is no bundle ID
> matching the profile. Check the bundle ID in the project. (Search the error log on
> Google/stackoverflow, expose the top 3, and create an answer with LLM)

Error example

FIG. 16

User Q: Create an Icon image to use in the app.
Chatbot A: Please answer the questions to create an icon and splash image.

Chatbot A: If there is text to be included in the Icon image, please enter it. If not, please press Enter.
User Q: inswave Chatbot A: Enter an image theme for the Icon.
User Q: dark Chatbot A: Enter an image style for the Icon. Ex) Plat, Material, ⋯
User Q: Material Chatbot A: Would you like to create an image based on the entered data?
1. Yes
2. No
User Q: 1
ChatBot A: Create a prompt to create an image. ⋯ ..
1. Prompt A
2. Prompt B
3. Prompt C
4. Prompt D
ChatBot A: Create an image based on the generated prompt.
The Icon has been created. Select an Icon.
1. Image A
2. Image B
3. Image C
4. Image D ICON/Splash Image generation example

AI-BASED APPLICATION BUILD AND DEPLOYMENT SUPPORT SYSTEM AND METHOD

CROSS-REFERENCE TO RELATED APPLICATION

The present application claims priority under 35 U.S.C. § 119 (a) to Korean application number 10-2024-0040189, filed on Mar. 25, 2024, in the Korean Intellectual Property Office, which is incorporated herein by reference in its entirety.

BACKGROUND

The present invention relates to AI (artificial intelligence)-based application build and deployment support system and method.

Digital transformation has been in the spotlight recently. Digital transformation means that our lives and business works are being converted to digital using new digital technologies.

Companies/organizations are changing to using the cloud to provide services without having to configure their own servers or operating environments. Using a cloud service means that data or resources exist on an external cloud.

This is bringing about a change to a new work environment of diverse collaboration and sharing through mobile devices such as smartphones, and the need for work programs capable of supporting collaboration and sharing is rapidly increasing to adapt to this.

Currently, the market is divided into platforms for mobile app development and desktop application platforms. In the mobile ecosystem, with the emergence of incompatible mobile operating systems such as Apple's iOS and Google's Android, the burden of developing separate applications for specific operating systems has increased, and hybrid apps, which can efficiently and easily create a single app that can run on multiple platforms such as IOS, Android, and Windows with a single development effort, have begun to attract attention.

Developers must be fully involved in a series of procedures for creating, building, and deploying these hybrid apps, but it is not easy to respond smoothly while being familiar with requirements for all procedures.

The background described above is technical information that the inventor possessed for the purpose of deriving the present invention or acquired during the reduction of the present invention to practice, and cannot necessarily be said to be a publicly known technology disclosed to the general public prior to the application of the present invention.

SUMMARY

The present invention is intended to provide an AI-based application build and deployment support system and method that can create an application project and support and/or deploy a build through a conversation with a user using an AI-based chatbot.

The present invention is intended to provide an AI-based application build and deployment support system and method that can collect and database difficulties encountered during the process of registering information required to create an applications that can run on multiple platforms (hereinafter, a multiplatform-enabled application) or correcting errors encountered during the build and/or deployment of the app, and provide an interactive guidance to a user to overcome the aforementioned difficulties.

Other objectives of the present invention will be readily understood through the following description.

According to one aspect of the present invention, there is provided a non-transitory computer-readable medium storing computer executable instructions for performing an AI (artificial intelligence)-based app build and deployment support method when executed by a computer, the method including classifying a user query into a corresponding one of a plurality of categories according to an API request for the user query input from a chat client through a web interface provided by an app manager that is configured to manage and control an app builder that is configured to perform app creation, build, and deployment, generating a context for the user query by retrieving a database for data to be added as the context to the user query according to the category, calling the data as a context information corresponding to the user query, and combining the user query and the context information, generating a LLM (large language model) prompt by calling a service module according to the category, and adding the context to a service-specific prompt provided by the service module, querying the LLM prompt through an LLM interface to a LLM and receiving a response thereto, and providing the response to the chat client as a response to the user query after validating the response.

The category may be one of a chat, an action for function requests related to app creation, build, and deployment, an image generation for app icon or splash image during app creation and setting, and a debugging for errors that occur when building or deploying apps.

The category is the action, and the service module is configured to receive parameter values corresponding to the function request related to app creation, setting, build, and deployment among the user queries, provide a result processed through the LLM as the response, and return as the response a JSON string required to run an app development API.

The category is the image generation, and the service module is configured to generate one or more of the app icons and splash images during app creation or setting, and return a URL or file related to the generated image as the response.

The category is the debugging, and the service module is configured to receive error logs that occur during app build or deployment as a result of the user query, or is called through a button provided when an error occurs on a build screen or a deployment screen, and provide database or Internet search results for the error log as the response.

The method further includes transmitting, by the app manager, a request to the app builder to apply or run the app based on the response.

According to another aspect of the present invention, there is provided a AI (Artificial intelligence)-based app build and deployment support server for providing AI-based support service to an app build and deployment system having an app builder that is configured to perform app creation, build, and deployment and an app manager that is configured to manage and control the app builder, including an API gateway, configured to receive API requests for a user query entered from a chat clients through a web interface provided by the app manager, to create a context by combining a context information retrieved by classifying the user query into a corresponding one of a plurality of categories, and execute individual services, a context service module, configured to retrieve the context information, which is data to be added as the context, from a database according to a categorized user query, an individual service module, configured to generate a LLM (large language model) prompt by adding the user query and the context for the user query generated by combining the user query and the context information to a service-specific prompt provided corresponding to the individual service, and an LLM interface, configured to query a LLM with the LLM prompt and receive a response thereto.

The API gateway is configured to validate the response and then to provide it to the chat client as a response to the user query.

The individual service module may include at least one of a chat service module, configured to perform a general chat function, an action service module, configured to process a request for functions related to app creation, setting, build, and deployment among the user queries, an image service module, configured to generate at least one of an app icon and a splash image during app creation or setting, and a debugging service module that is called by inputting an error log that occurs during app build or deployment or by inputting a button provided when an error occurs on a build screen or a deployment screen.

The category is the image generation and the individual service module is the image service module, and the image service module is configured to return a URL or file related to the generated image as the response The category is the debugging and the individual service module is the debugging service module, and the debugging service module is configured to provide database or Internet search results for the error log as the response.

The app manager is configured to transmit a request to the app builder to apply or run the app based on the response, and the app builder is configured to build or deploy app based on the request.

Other aspects, features and advantages other than those described above will become apparent from the following drawings, claims and detailed description of the invention.

According to one embodiment of the present invention, it is advantageous to create an application project and support and/or deploy a build through a conversation with a user using an AI-based chatbot.

It is also advantageous to collect and database difficulties encountered during the process of registering information required to create a multiplatform-enabled application or correcting errors encountered during the build and/or deployment of the app, and provide an interactive guidance to a user to overcome the aforementioned difficulties.

The effects to be obtained from the invention are not limited to those mentioned above, and other effects not mentioned will be apparent to one having ordinary skill in the art to which the invention belongs from the following description.

BRIEF DESCRIPTION OF ACCOMPANYING DRAWINGS

FIG. 11, FIG. 12 and FIG. 13 are examples of queries and responses in an action category;

FIG. 14 is an example of queries and responses in a general category;

FIG. 15 is an example of queries and responses in a debugging category;

FIG. 16 is an example of queries and responses in an image generation category.

DETAILED DESCRIPTION

Figure 1:
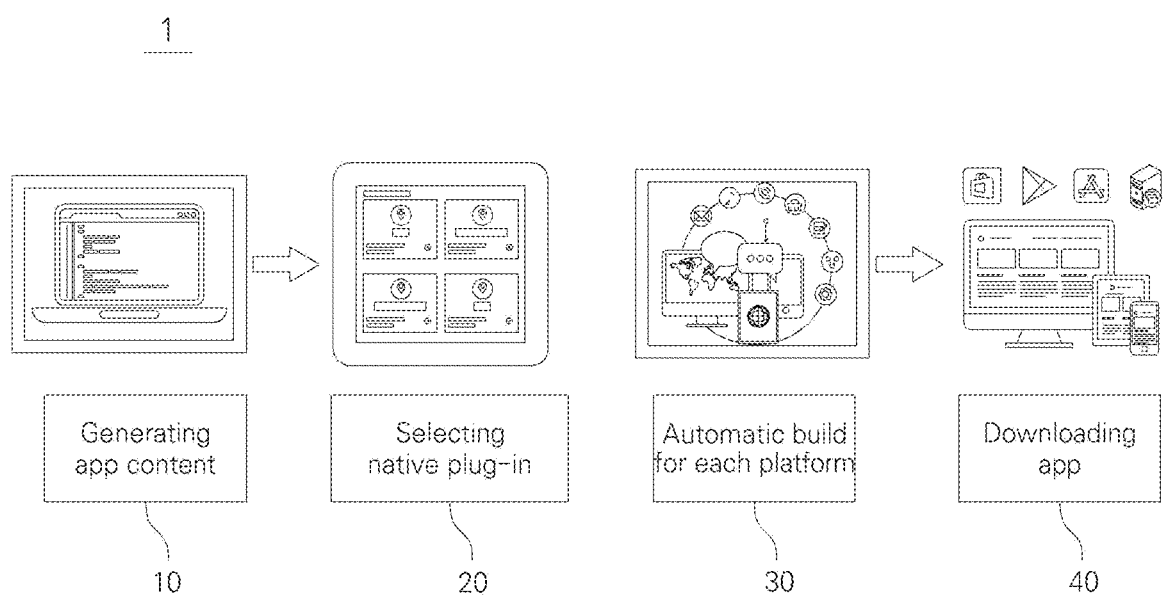
FIG. 1 illustrates an app build and deployment system according to one embodiment of the present invention.

The invention can be modified in various forms and specific embodiments will be described below and illustrated with accompanying drawings. However, the embodiments are not intended to limit the invention, but it should be understood that the invention includes all modifications, equivalents, and replacements belonging to the concept and the technical scope of the invention.

If it is mentioned that an element is "connected to" or "coupled to" another element, it should be understood that still another element may be interposed therebetween, as well as that the element may be connected or coupled directly to another element. On the contrary, if it is mentioned that an element is "connected directly to" or "coupled directly to" another element, it should be understood that still another element is not interposed therebetween.

Terms such as first, second, etc., may be used to refer to various elements, but, these element should not be limited due to these terms. These terms will be used to distinguish one element from another element.

The terms used in the following description are intended to merely describe specific embodiments, but not intended to limit the invention. An expression of the singular number includes an expression of the plural number, so long as it is clearly read differently. The terms such as "include" and "have" are intended to indicate that features, numbers, steps, operations, elements, components, or combinations thereof used in the following description exist and it should thus be understood that the possibility of existence or addition of one or more other different features, numbers, steps, operations, elements, components, or combinations thereof is not excluded.

As used herein, a "unit" includes a unit realized by hardware, a unit realized by software, and a unit realized by both. Further, one unit may be implemented using two or more hardware, or two or more units may be implemented using one hardware. In addition, the term "unit" is not meant to be limited to software or hardware, and the "unit" may be configured to reside on an addressable storage medium or may be configured to execute one or more processors. Thus, in one example, "~unit" may include components, such as software components, object-oriented software components, class components, and task components, processes, functions, properties, procedures, subroutines, segments of program code, drivers, firmware, microcode, circuits, data, databases, data structures, tables, arrays, and variables. The functionality provided within the components and "~units" may be combined into fewer components and "~units" or further separated into additional components and "~sub-units". In addition, the components and "~units" may be implemented to recycle one or more CPUs in the device.

Elements of an embodiment described below with reference to the accompanying drawings are not limited to the corresponding embodiment, may be included in another embodiment without departing from the technical spirit of the invention. Although particular description is not made, plural embodiments may be embodied as one embodiment.

In describing the invention with reference to the accompanying drawings, like elements are referenced by like reference numerals or signs regardless of the drawing numbers and description thereof is not repeated. If it is determined that detailed description of known techniques involved in the invention makes the gist of the invention obscure, the detailed description thereof will not be made.

Figure 2:
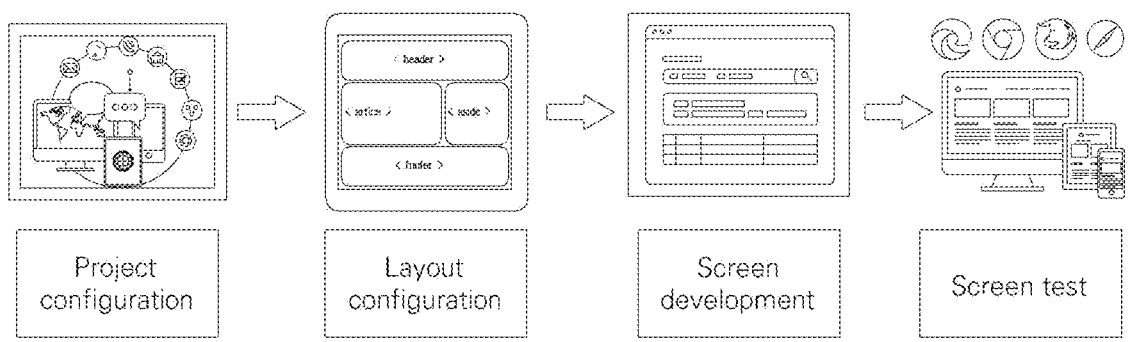
FIG. 2 illustrates an app development process.
Figure 3:
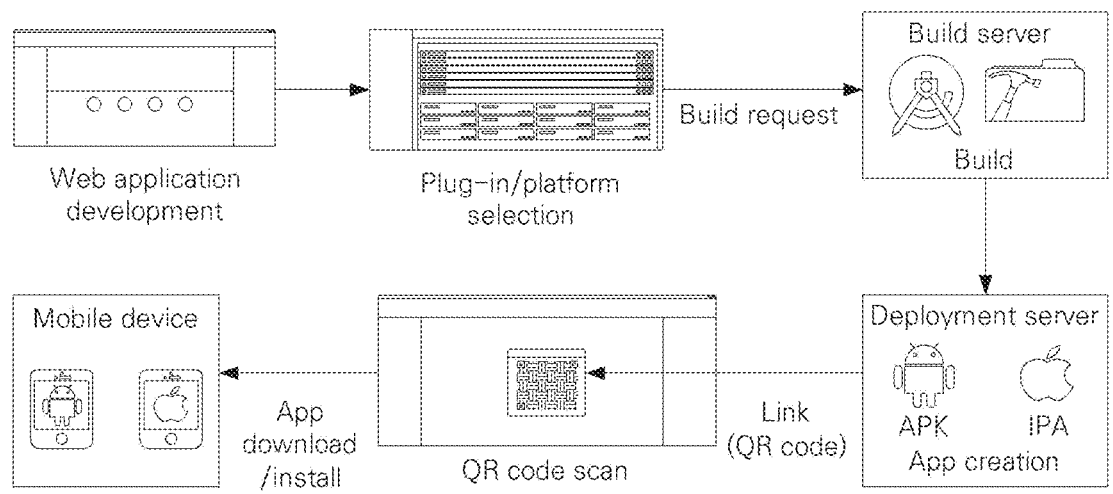
FIG. 3 is a flowchart of an app build method according to one embodiment of the present invention.
Figure 4:
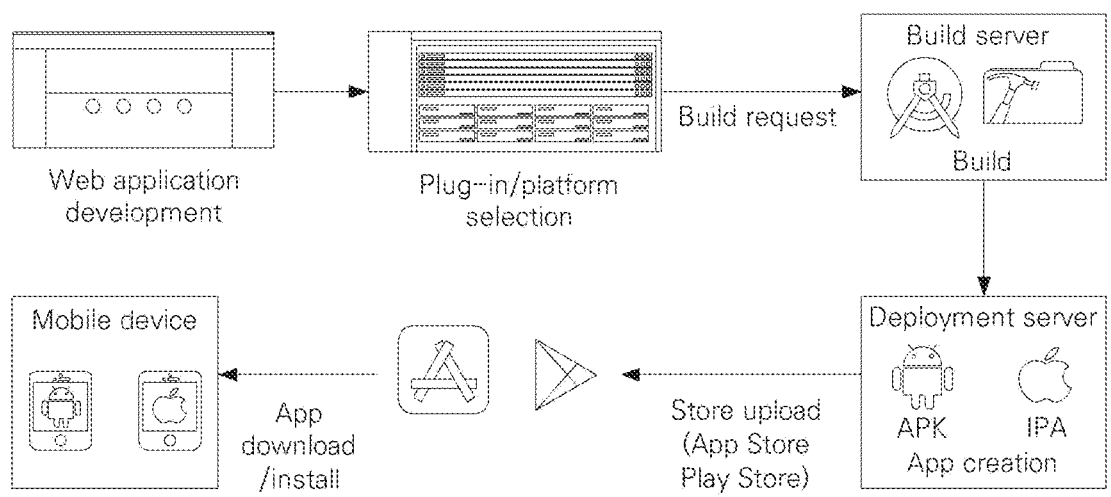
FIG. 4 is a flowchart of an app deployment method according to one embodiment of the present invention.

FIG. 1 illustrates an app build and deployment system according to one embodiment of the present invention, FIG. 2 illustrates an app development process, FIG. 3 is a flowchart of an app build method according to one embodiment of the present invention, and FIG. 4 is a flowchart of an app deployment method according to one embodiment of the present invention.

The app build and deployment system 1 according to one embodiment of the present invention functions as a universal app platform for digital transformation. In this context, an app or app project means an application that supports multiplatform, i.e., a multiplatform-enabled app.

The app build and deployment system 1 may enable the development of a cross-platform application that inherits the advantages of a hybrid app. It can implement native functions using web standard technology and can support multiple platforms. In addition, it can provide plug-in APIs for platform-specific native integration, and native plug-ins for various third-party integrations may be possible. For operation and maintenance, it can provide app management, deployment, notification, error/performance monitoring, statistics/charts, collaboration management, big data analysis/prediction, and mass deployment capabilities. In addition, it can minimize the number of native developers as an app creation/build/deployment system that supports both iOS and Android environments.

The app build and deployment system 1 may provide platform-specific native functions in the form of built-in plug-ins, and create and then build and deploy multiplatform-enabled apps using web standard technology such as JavaScript, HTML, CSS, etc.

The app build and deployment system 1 provides a function for building and deploying an app project developed using the W-Matrix program developed by the applicant or a general Android or iOS project. A user can create an app installation file using the build function on a web screen without installing a development tool on a PC. In addition, the deployment function provides in-house deployment and store deployment for both Android and iOS platforms. It provides simple project setting changes such as app name, version, icon, etc., and plug-in addition/removal.

Referring to FIG. 1, the app build and deployment system 1 may include an app content creation unit 10, a native plug-in selection unit 20, a build unit 30, and a deployment unit 40.

The app build and deployment system 1 may enable a web developer to build Android apps and/or iOS apps by using the build unit 30 without having to to build a separate app build environment. Even if there is no native developer, the system 1 may allow a web developer to develop/build/deploy/operate apps including native functions through plug-ins provided by the system 1.

The app content creation unit 10 may be configured to enable a developer web developer to create app content that he or she wants to provide in the form of a web app. The app content creation unit 10 can be applied with various web app development tools that enable the development of web apps.

Referring to FIG. 2, in a web app development process, a project configuration step, a layout configuration step, a screen development step, and a screen test step may be sequentially performed to develop a web standard app.

In the project configuration phase, a project for app to be developed, built, and deployed.

In the layout configuration step, various layouts for the app can be configured through a layout wizard or a layout template.

In the screen development step, the app screen can be developed using functions such as page templates, component wizards, design systems, and user-defined components. In addition, in one embodiment, a native plug-in component can be provided to create the multiplatform-enabled app.

In the screen test step, OSMU (One Source Multi Use) test can be performed so that the optimal screen can be displayed on various screen sizes such as PCs, tablets, and smartphones.

Referring back to FIG. 1, the native plug-in selection unit 20 may be configured to select a native plug-in to be additionally applied to the app content created by the app content creation unit 10 based on user (namely, developer) input.

Web developers can control native plug-ins through a web common modules using standard JS. Native plug-ins are built-in plug-ins and can include default plug-ins and third-party linkage plug-ins.

The build unit 30 may be configured to apply the native plug-ins selected by the native plug-in selection unit 20 to the app content created by the app content creation unit 10 according to a build request, thereby enabling automatic building for each platform.

If a web screen is created in the app content, a step of applying plug-in is as follows.

The plug-in selected by the native plug-in selection unit 20 can be additionally applied. In this case, the plug-in version to be applied can be selected. When applying the plug-in, it can be applied by use of a separate CLI (Command Line Interface) tool for each platform. For Android, it can be automatically performed through gradle, and for iOS, it can be automatically performed through a command tool.

In addition to adding, selected plugins can also be removed. This can be done by selecting the plugin to be removed from the list of applied plugins. When removing, version selection is required, and the applied version may be automatically selected and removed.

For the plug-in selected by the native plug-in selection unit 20, the build unit 30 may be configured to perform a project plug-in duplication check. Plug-in meta information can then be retrieved. Plug-in dependency information and plug-in meta information can be added to the project. Plug-in js file can be copied to the project, and library and framework files can be applied to the project. The plug-in application can then be completed by copying the necessary resources such as images, layouts, etc.

After applying the plug-in settings, the build unit 30 proceeds with the project build.

The detailed build process performed by the build part 30 is as follows.

When the build starts, the latest source code is updated through (VCS) Git Pull. Then, the app information is retrieved from within the app. After retrieving the app information, the build process is performed and the app is uploaded to the in-house deployment server. The build is completed by modifying app information (namely, build number), committing and pushing a source code through (VCS) Git Push. When the build is complete, QR code, app file, and log file functions can be provided.

The deployment unit 40 may be configured to deploy the app built by the build unit 30 to the developer through the in-house deployment server in a downloadable form such as APK, IPA, etc., for the first deployment (in-house deployment). Upon developer approval, the app is registered in the platform-specific store for the second deployment (store deployment), allowing general users to download, install, and run the app.

Referring to FIG. 3, during the first deployment, a downloadable link can be displayed on the screen of the developer terminal. The downloadable link can be displayed in the form of a QR code, for example. Thus, by scanning the QR code displayed on the terminal screen using a camera of a mobile device such as a smartphone, the developer can download and install (and update, if necessary) the currently built app on the mobile device, thereby verifying that it has been built properly (check if the plug-in has been applied).

Referring to FIG. 4, in the second deployment, if there is the developer's approval for the app that was confirmed to have been built normally through the first deployment, the app built by the build unit 30 can be uploaded to the platform-specific store such as Apple's App Store, Google's Play Store, etc. The app uploaded to the store can be downloaded and installed by general users through mobile devices.

In order to create, build, and deploy an app or app project using this app build and deployment system 1, it is necessary to understand the technical documentation and guides related to this system and the Android and iOS platforms.

In the app manager, various profiles (information required for app project build and deployment) must be created through the web interface to enable project creation, build, and deployment. To create each profile, it is necessary to obtain certificates, profiles, and API keys provided by Android and iOS and register them in the app manager. In addition, if an error occurs during app build and deployment, only the app developer can fix the error.

In one embodiment, the difficulties that users encounter when using the app build and deployment system 1 may be collected and databased, and the aforementioned difficulties are overcome through an AI-based support system (AI Assistant).

Hereinafter, the AI-based app build and deployment system and method will be described in detail with reference to related drawings.

Figure 5:
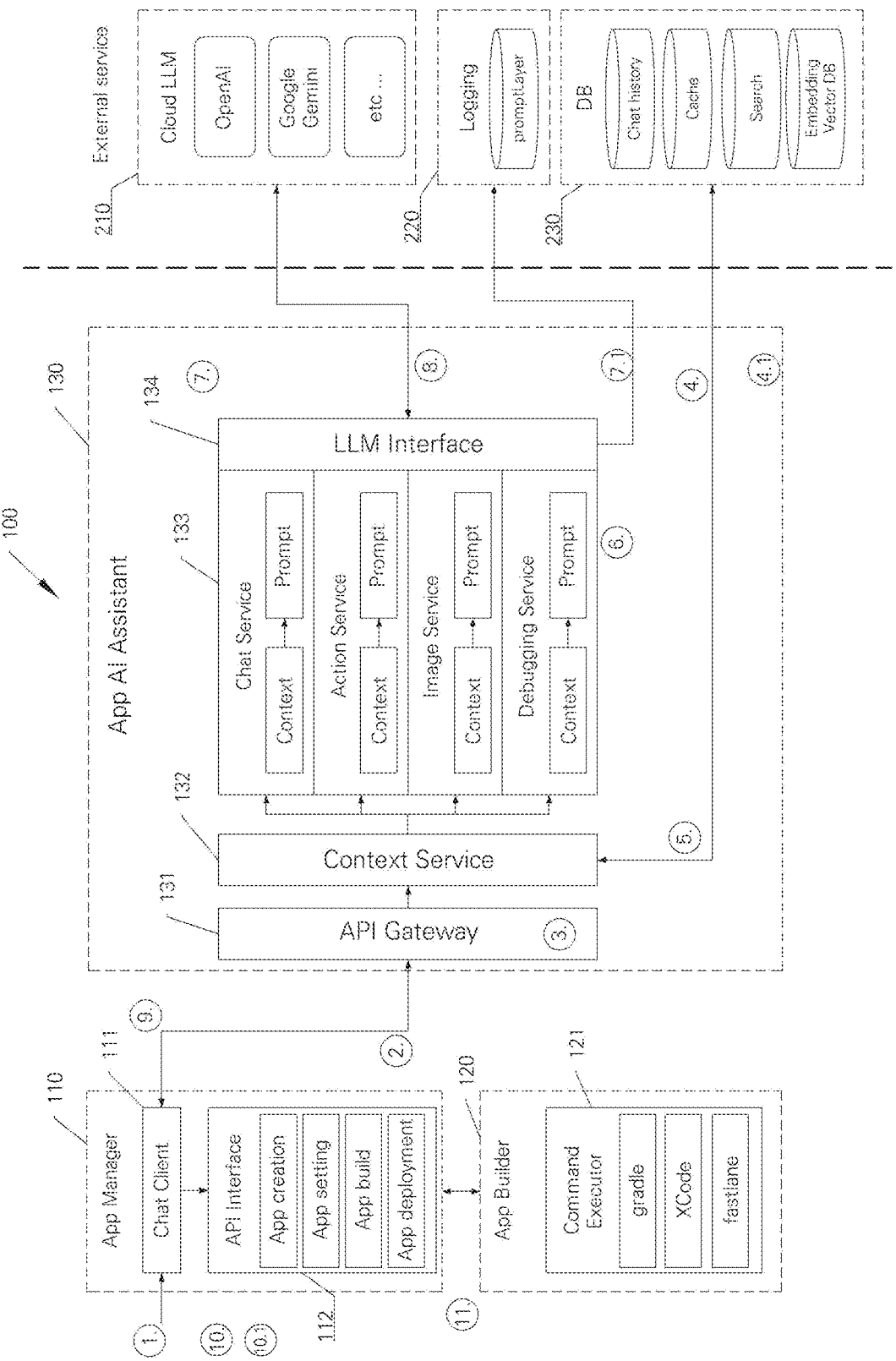
FIG. 5 is a block diagram of AI-based app build and deployment system according to one embodiment of the present invention.
Figure 6:
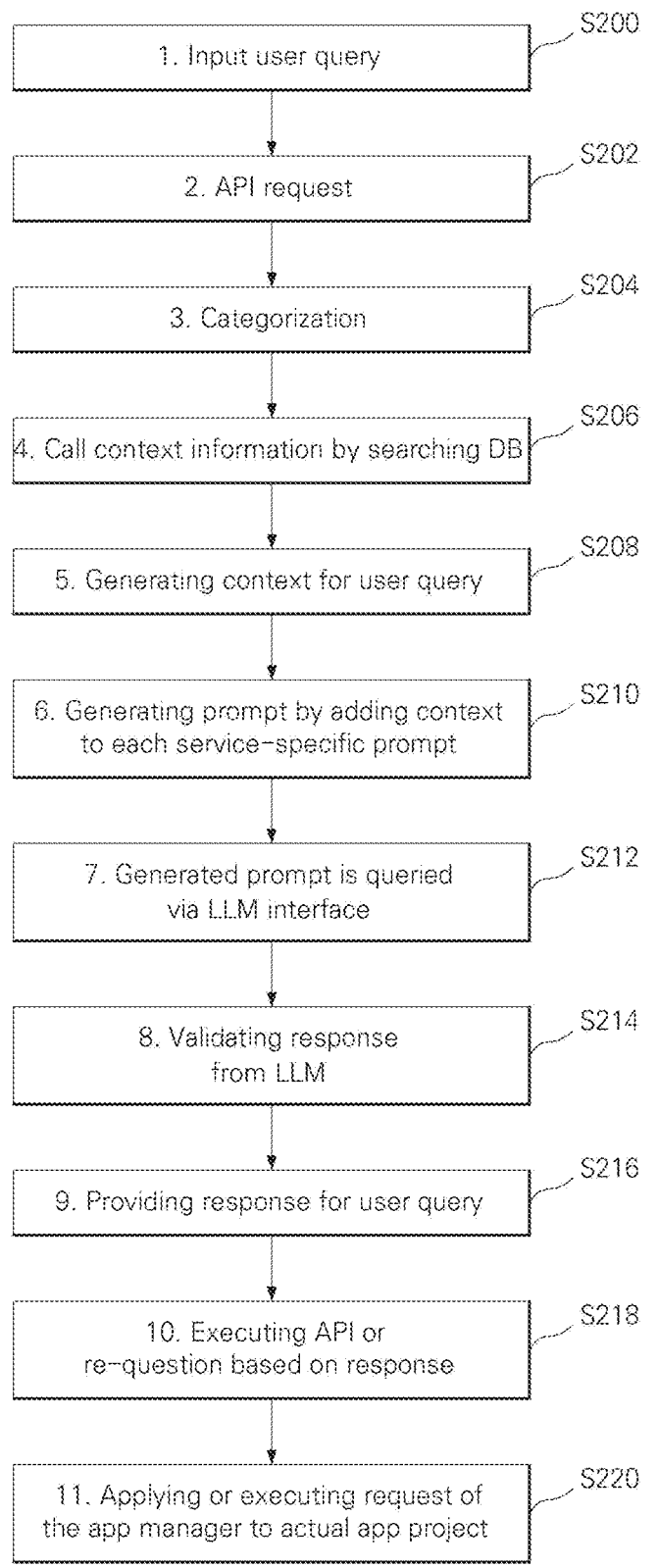
FIG. 6 is a flowchart of AI-based app build and deployment support method according to one embodiment of the present invention.
Figure 7:
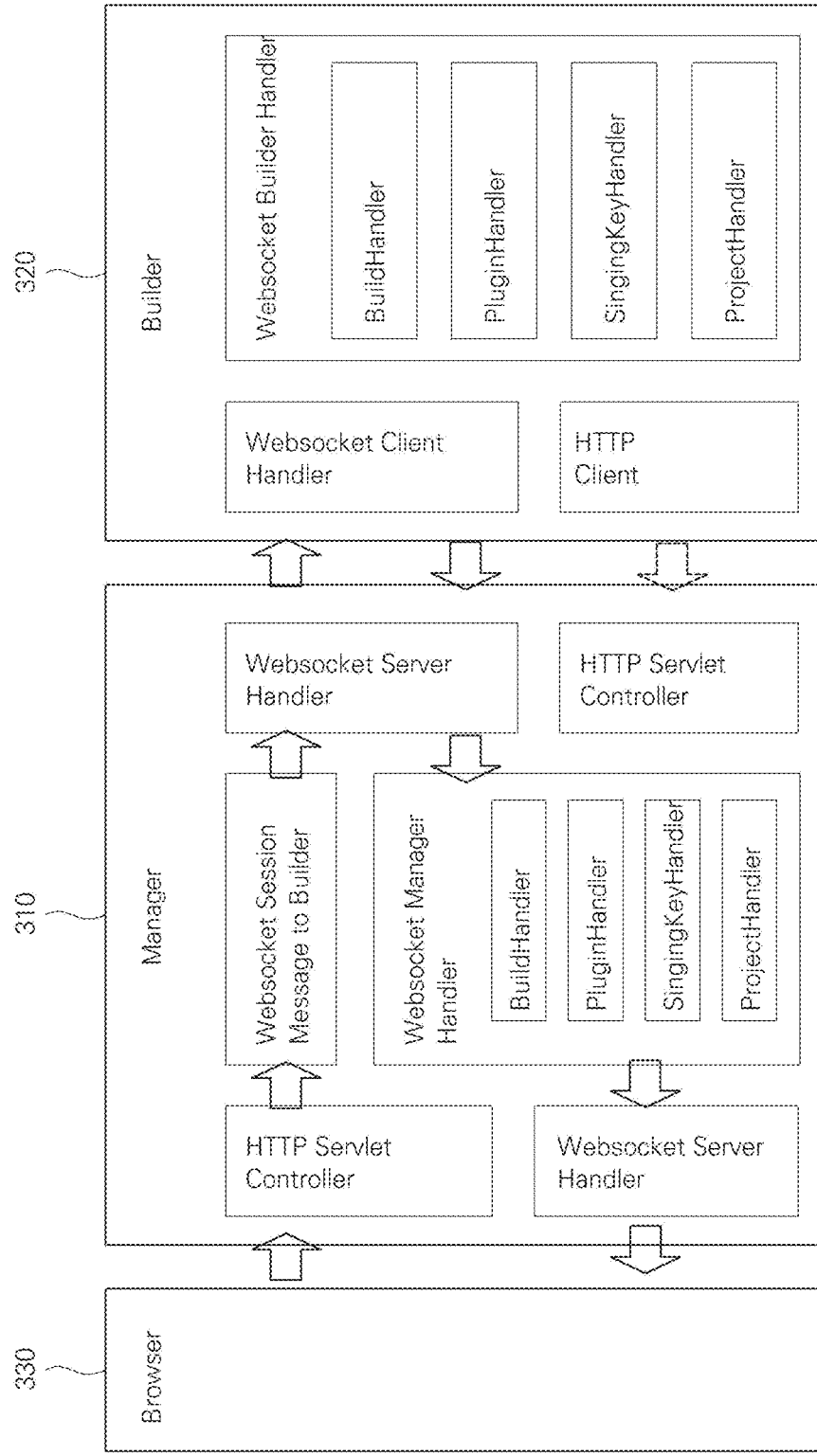
FIG. 7 is a block diagram of app build and deployment system.
Figure 8:
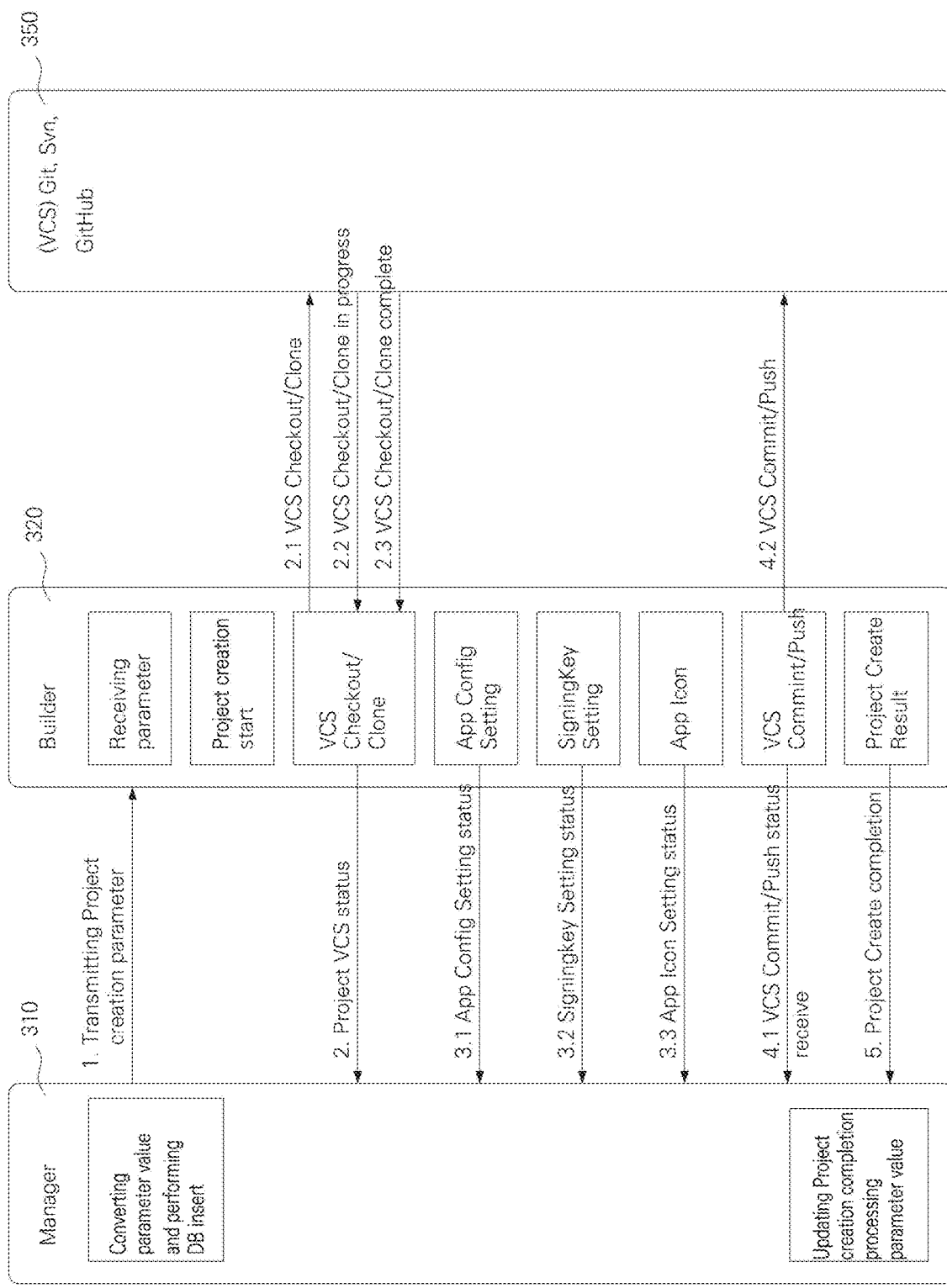
FIG. 8 is a flowchart of a project creation (VCS sync) method.
Figure 9:
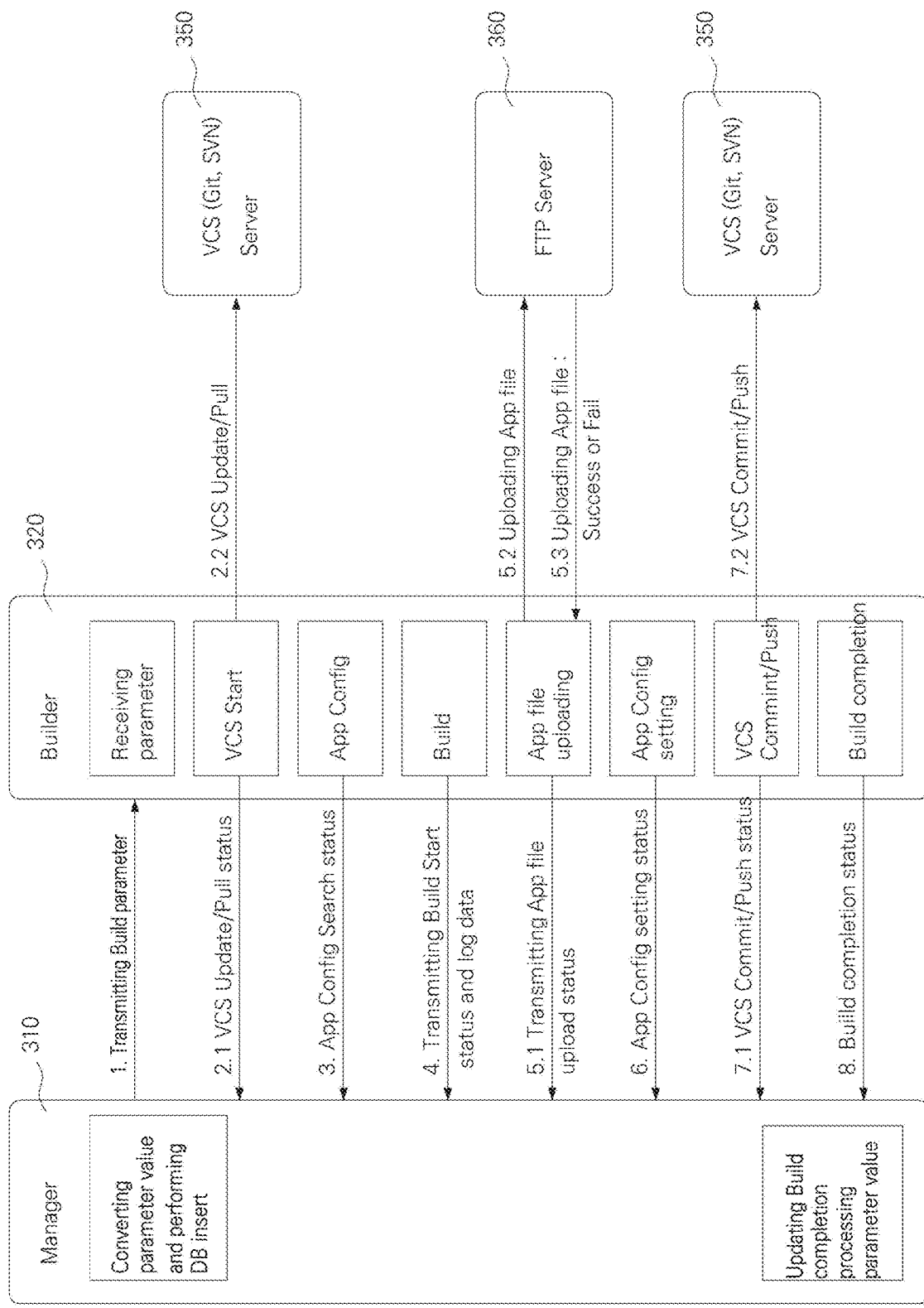
FIG. 9 is a flowchart of a build method.
Figure 10:
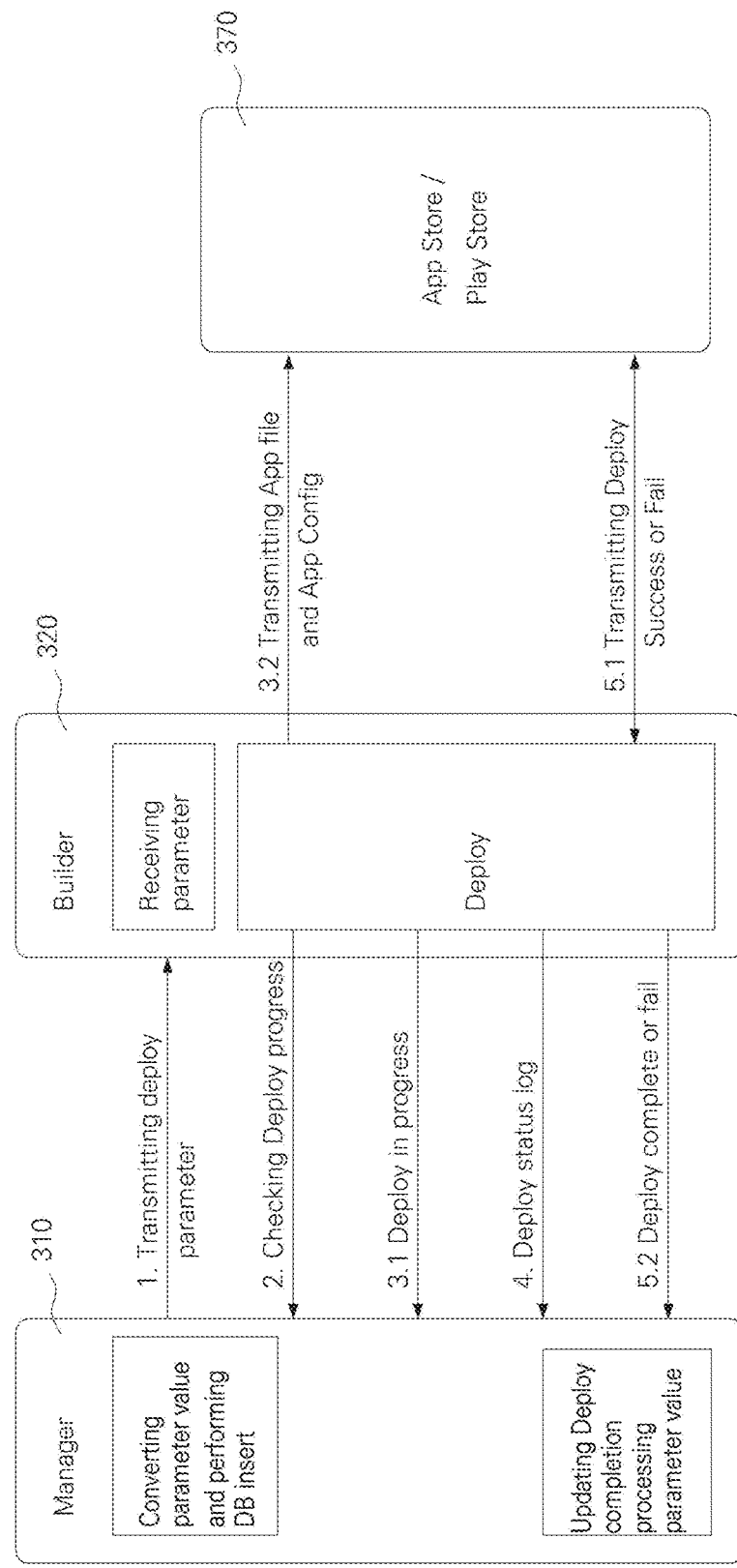
FIG. 10 is a flowchart of a deployment method.

FIG. 5 is a block diagram of AI-based app build and deployment system according to one embodiment of the present invention, FIG. 6 is a flowchart of AI-based app build and deployment support method according to one embodiment of the present invention, FIG. 7 is a block diagram of app build and deployment system, FIG. 8 is a flowchart of a project creation (VCS sync) method, FIG. 9 is a flowchart of a build method, FIG. 10 is a flowchart of a deployment method, FIGS. 11 to 13 are examples of queries and responses in an action category, FIG. 14 is an example of queries and responses in a chat category, FIG. 15 is an example of queries and responses in a debugging category, and FIG. 16 is an example of queries and responses in an image generation category.

The AI-based app build and deployment system and method according to one embodiment of the present invention can interact with a user via an AI-based chatbot to assist in creating, building, and/or deploying an app or app project.

AI-based app build and deployment support system 100 according to one embodiment may include an AI-based app build and deployment support server 130 and may operate in conjunction with an app manager 110 included in the app build and deployment system 1.

The app manager 110 provides a web interface (Web UI) for users and administrators and manages (controls) the app builder 120.

The app manager 110 may include a chat client 111. The chat client 111 is a web interface for providing chat with users. In addition, it communicates with the AI-based app build and deployment support server 130 to request a user query and receive a response thereto.

In addition, the app manager 110 may include an API interface 112. The API interface 112 may include an app creation module, an app setting module, an app build module, and an app deployment module.

The app builder 120 creates, builds, and deploys multi-platform-enabled app. The app builder 120 may include a command execution module 121 for the multi-platforms on which the app project will be applied or executed.

The AI-based app build and deployment support server 130 is a server for providing chat, action, image generation, and debugging capabilities to the app manager 110, which may utilize an AI-based chatbot.

When an action is given through the AI-based app build and deployment support server 130, a work plan is created for a user's initial query, and a LLM (Large Language Model) is sequentially asked and answered according to the work plan to create a response to the query requested by the initial user.

An API gateway 131 is a Rest API controller, and creates a context by classifying user queries into categories and executes individual services. The categories may include chat, action, debugging, and image generation.

A context service module 132 may be configured to retrieve data to be added as context in the DB 230 for a user query.

A chat service module 133 may be configured to perform a general chat function. A prompt to request to a LLM 210 is created based on the context for a user query. Then the query/response to the LLM is processed through a LLM interface 134.

An action service module 133 is a service module configured to process function requests related to app creation, setting, build, and deployment among user queries. The action service module 133 is configured to receive parameter values from the user through chatting and process them through the LLM so that the API provided by the app build and deployment system 1 can be executed. In response, a JSON string is returned that is required to execute the app development API.

An image service module 133 is a service module configured to create one or more of an app icon and a splash image when creating/setting an app through the app build and deployment system 1. The image service module 133 is configured to receive values required for creating an icon and/or a splash image from a user via chatting, create the image, and return a URL or file related to the created image.

A debugging service module 133 is a service module configured to receive input of error logs that occur when building or deploying an app, or is invoked through input (e.g., pressing) of a button (e.g., an AI analysis button) provided when an error occurs on a build/deployment screen. The debugging service module 133 is configured to search a database or the Internet for the error log and suggest a solution. The response format may be a JSON string, and may be in the form of a reference URL attached in addition to text (answer).

The LLM interface 134 is a module configured to provide an interface with an external service, LLM. The LLM interface 134 may be a SDK (Software Development Kit) configured to provide a chain that can create a language model-based application by combining several components based on a library (e.g., LangChain) used to develop LLM.

Model I/O is configured to provide an interface with a language model. Data connection provides an interface with application-specific data. Chains configure a call sequence. Agents allow the chains to select a tool to use based on user input. Memory maintains the state of the application between executions of the chains. Callbacks record or stream intermediate steps of the chains.

The external service device may include one or more of a cloud LLM 210, a logging server 220, and a database 230.

The cloud LLM 210 is a service device configured to provide a generative AI service, and may include generative AI tools such as Microsoft's OpenAI and Google's Gemini.

The logging server 220 may include a prompt layer. The prompt layer functioning as a middleware between LLM (e.g., OpenAI) libraries is configured to log all API requests and store relevant metadata for easy navigation and retrieval in the dashboard.

Among the databases 230, a chat history DB is configured to store chat history when chatting between a user and a chatbot.

A cache DB is configured to store responses from LLM in the past. Since not all user queries can be sent to LLM, responses already received from LLM are stored in the cache DB and responded. When a user query comes in, if it is a perfectly matching query, the cache DB can process the response.

A search DB is a database for a search engine. The search DB is configured to enable fast and accurate retrieval of data such as technical documents, guides, and API specifications related to the app build and deployment system to create a context that matches the user query. For example, the search DB can be Elasticsearch DB for Elasticsearch, an Apache Lucene-based Java open-source distributed search engine.

Vector embedding refers to extracting feature data in various forms, such as words, sentences, images, videos and converting them into high-dimensional vectors. These vectors are stored in an embedding vector DB, and the most similar data to the user's query can be searched and provided through cosine similarity search. Embedding vectors can be extracted and stored in the DB for technical documents, API specifications, and so on related to the app build and deployment system and used to create context.

Hereinafter, an AI-based app build and deployment support method performed in the AI-based app build and deployment system 100 will be described with reference to FIG. 6.

1. The app manager 110, particularly the chat client 111, is configured to receive a user query at step S200.
2. The chat client 111 is configured to transmit an API request to the AI-based app build and deployment support server 130, particularly the API gateway 131, in response to the user query at step S202.
3. The API gateway 131 is configured to classify the user query into categories at step S204. The categories may include Chat, Action, Image generation, and Debugging.
4. The context service module 132 is configured to search the DB for data to be added as context (namely, context information) for the user query according to the classified category and calls the context at step S206. 4.1 In the case of a general chat, if there is an identical query response in the cache DB, it can be responded to immediately.
5. The context service module 132 is configured to create a context for the user query according to the search results of the database 230 at step S208.
6. Based on the context for the user query, a LLM prompt can be generated by adding the context to each service-specific (chat service, command service, image generation service, debugging service) prompt at step S210.
7. The generated LLM prompt is queried to the external service, the cloud LLM 210, through the LLM interface 134 at step S212. 7.1 The prompt generated by the LangChain can be logged in the logging server 220.
8. The response received from the LLM 210 may be validated, re-questioned or a response can be generated at step S214.
9. The generated response can be provided as a response to the user query requested by the API from the chat client 111 at step S216.
10. The chat client 111 is configured to execute the API or re-question based on the response at step S218. 10.1 Additional queries for the response result may be recommended or the satisfaction level of the answer can be checked.
11. The app builder 120 is configured to apply the request of the app manager 110 to an actual app project or execute at step S220.

The application or execution process for the app project performed at step S220 will be described with reference to FIGS. 7 to 10. Here, a manager server 310 corresponds to the app manager 110, and a builder 320 corresponds to the app builder 120.

One or more builders 320 may be connected to one manager server 310.

The manager server 310 is provided through the web and configured to manage and control the builder 320.

The manager server 310 is configured to provide a UI (user interface) and user data for interfacing with users, transmit the user's action to the builder 320, and perform a build information management role.

The builder 320 is a module configured to actually build Android and iOS apps. In addition, the builder 320 may be configured to deploy the built app.

The builder 320 functions as a build server configured to actually perform the app build. In addition, the builder 320 is configured to perform the roles required for app building, such as version control link, result upload, and so on.

In one embodiment, a project may be created based on a template provided by the system. App project VCS (Version Control System) synchronization is also possible. App build, version control, deployment, and plugin management are possible through the web without a native developer. Project addition and modification are possible by linking the source code worked by the developer with the VCS server. Real-time log check and download of the build status are possible. The built app can be installed through a QR code.

The web browser 330 is configured to communicate with the manager server 310, and can be executed on the web developer terminal to provide a screen (web UI) for users and administrators.

Settings for projects/builds/deployments can be made through a web browser 330. Settings may be made to builders, VCS, FTP, certificates, and so on.

Builder information to be connected to the manager server 310 can be created in a builder settings screen. The builder information may include a builder name (entering a name that can be distinguished from a selection list), a builder User ID (entering the same ID as the physically configured builder yaml settings), user permissions (build, deploy (check if necessary)), builder URL (URL information for the builder), and so on.

VCS settings screen may be used when creating Git/SVN/LocalGit property information for a newly created project. VCS information may include a VCS name, a VCS type (selected from Git/SVN/LocalGit), a VCS user ID, a VCS user password, a VCS server URL (VCS access URL), and so on.

The FTP settings screen may be used to set FTP property information for a new project. FTP information may include a FTP name, a FTP server URL, a FTP server IP, a FTP server port, a FTP user ID, a FTP user password, and so on.

Certificate (Signing Key) settings screen is a screen for creating and saving certificate information and file information required for a new project and build. Since the certificate file formats for Android and iOS are different, the screen configuration may be different for each platform.

Common input values may include a certificate name, a builder ID, a platform, a domain ID, an administrator ID, and so on.

Android certificate input values may include a certificate type (Signingkey Type), a Build Type, a Key Alias, a Key Password, a Store Password, and a certificate file (Signing Key file).

The iOS certificate input values may include a certificate type (Signingkey Type), a Certificate Key file path, a Certificate Key Password, a debug Profile file path, a Release Profile file path, and so on.

The manager server 310 may include an HTTP servlet controller, a Websocket Session Message to Builder, a Websocket Manager Handler, and a Websocket Server Handler.

The builder 320 may include a Websocket Client Handler, a Websocket Builder Handler, and a HTTP Client.

The manager server 220 is configured to start with the HTTP Servlet Controller communication.

The parameter information is processed inside the HTTP Servlet Controller. Then, a message is sent to the Websocket Session Message to Builder.

The builder 320 is configured to receive a websocket message from the manager server 310 and transfer the parameters to the Websocket Builder Handler. It moves to Build Handler, and the internal process operates.

When the operation is complete, the builder 320 is configured to transfer the websocket message to the manager server 310.

The manager server 310 is configured to move to the build handler with the parameters received from the builder 320, and transfer them to the browser 330 through the Websocket Server Handler.

The flowchart of project creation, setting, and import (VCS Sync) is illustrated in FIG. 8.

The manager server 310 is configured to process parameters required for project creation and transfers them to the builder 320. While transferring, DB Insert function may be performed.

The builder 320 is configured to start the project creation based on the parameter values transferred from the manager server 310.

When creating a project, VCS Checkout/Clone action is performed. At the same time as the execution of the action, the message value is sent from the builder 320 to the manager server 310 via VCS status Websocket.

When the VCS Checkout/Clone task is complete, App Config Setting CLI is performed. Similarly, the message value is sent to the manager server 310 via App Config Setting status Websocket.

When the App Config Setting task is complete, Certificate Setting (SigningKey Setting) task is performed.

When the Certificate Setting task is complete, App Icon Set task is performed. Similarly, the message value is sent to the manager server 310 via App Icon Setting status Websocket.

When the App Icon Set task is complete, VCS Commit/Push task is performed. Similarly, the message value is sent to the manager server 310 via VCS Commit/Push status Websocket.

When the VCS Commit/Push task is complete, Project Create completion processing parameter value is transmitted to the manager server 310.

The manager server 310 is configured to process the DB update using the Project Creation completion processing parameter value received from the builder 320.

The build communication flowchart is illustrated in FIG. 9.

The manager server 310 is configured to process parameter values required for the build and transmits it to the builder 320. While transferring, DB Insert function may be performed.

The builder 320 is configured to start the build based on the parameter values transferred from the manager server 310.

When the build is performed, VCS Update/Pull action is performed. At the same time as the execution, the message value is sent from the builder 320 to the manager server 310 via the VCS status Websocket.

When the VCS Update/Pull task is complete, App Config Search CLI is performed. Similarly, the message value is sent to the manager server 310 via App Config Query status Websocket.

When the App Config Search task is complete, Build CLI task is performed. Similarly, the message value is sent to the manager server 310 via Build status Websocket.

When the Build CLI task is complete, App File Upload task is performed. Similarly, the message value is sent to the manager server 310 via App File Upload status Websocket.

When the App File Upload task is complete, App Config Setting task is performed. Similarly, the message value is sent to the manager server 310 via App Config Setting status Websocket.

When the App Config Setting task is complete, the VCS Commit/Push task is performed. Similarly, the message value is sent to the manager server 310 via the VCS Commit/Push status websocket.

When the VCS Commit/Push task is complete, Build Completion processing parameter value is transmitted to the manager server 310.

The Build Completion processing parameter value transmitted from the builder 320 to the manager server 310 is received and DB update is performed.

The deployment flow chart is illustrated in FIG. 10.

The manager server 310 is configured to process the parameters required for Deploy and transmits them to the builder 320. While transferring, DB Insert function may be performed.

The builder 320 is configured to start deployment based on the parameter values transmitted from the manager server 310.

When performing deployment, Deploy action is performed. At the same time as the execution, the builder 320 is configured to send message values to the manager server 310 via Deploy status Websocket.

When Deploy CLI task starts, the app file and app config information are transmitted to App store/Play store.

Deploy status log data is output. The data is immediately transmitted to the manager server 310 as Websocket message value.

When App store/Play store sends Deploy success or failure value, the builder 320 is configured to receive the value, and transmit the Websocket message value to the manager server 310.

The Deploy completion processing parameter value transmitted from the builder 230 to the manager server 220 is received and DB update is performed.

The AI-based app build and deployment support server 130 according to one embodiment can support query and response for the following categories.

Chat: General queries about app build and deployment (see FIG. 14)

Action: Execution of app build such as project creation, modification, build, and deployment, and services provided by the app build and deployment system (see FIG. 11 to FIG. 13)

Debugging (error/error log): Generating of error resolution methods through DB search and web search when errors occur during build/deployment (release) (see FIG. 15)

Image generation: Generating of app icon/splash image (see FIG. 16)

Figure 17:
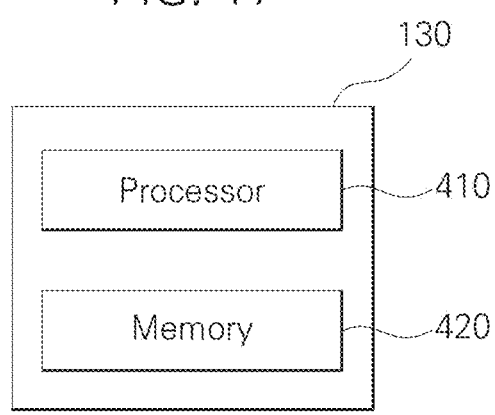
FIG. 17 illustrates a configuration of a system according to one embodiment of the present invention.

FIG. 17 illustrates a configuration of a system according to one embodiment of the present invention.

Referring to FIG. 17, the AI-based app build and deployment support server 130 may include a processor 410 and a memory 420. The memory 420 may store one or more commands executable by the processor 410. The processor 410 may execute one or more commands stored in the memory 420. The processor 410 may execute one or more operations described above with respect to FIGS. 6 to 16 by executing instructions. In addition, the configuration of the present invention described above with reference to FIG. 5 may be a configuration implemented by instructions executed by the processor 410.

The above-described AI-based app build and deployment support method may also be implemented in the form of a non-transitory recording medium including instructions executable by a computer, such as an application or program module executed by a computer. Non-transitory computer-readable medium can be any available media that can be accessed by a computer and includes both volatile and nonvolatile medium, removable and non-removable media. In addition, non-transitory computer-readable medium may include computer storage medium. Computer storage medium includes both volatile and nonvolatile, removable and non-removable media implemented in any method or technology for storage of information such as computer readable instructions, data structures, program modules or other data.

The above-described AI-based app build and deployment support method may be executed by an application (which may include a program included in a platform or operating system by default installed in the terminal) installed by default in the terminal, and by an application (i.e., program) that a user manually installed in the terminal after downloading from an application store server, or an application providing server such as a web server related to the application or service. In this sense, the above-described AI-based app build and deployment support method may be implemented as an application (i.e., program) installed by default in the terminal or manually installed by a user, and may be recorded in the non-transitory computer-readable recording medium such as the terminal.

While the invention has been described above with reference to exemplary embodiments, it will be understood by those skilled in the art that the invention can be modified and changed in various forms without departing from the concept and scope of the invention described in the appended claims.

What is claimed is:

1. A non-transitory computer-readable medium storing computer executable instructions for performing an AI (artificial intelligence)-based app build and deployment support method when executed by a computer, the method comprising:

classifying a user query into a corresponding one of a plurality of categories according to an API request for the user query input from a chat client through a web interface provided by an app manager that is configured to manage and control an app builder that is configured to perform app creation, build, and deployment;

generating a context for the user query by retrieving a database for data to be added as the context to the user query according to the category, calling the data as a context information corresponding to the user query, and combining the user query and the context information;

generating a LLM (large language model) prompt by calling a service module according to the category, and adding the context to a service-specific prompt provided by the service module;

querying the LLM prompt through an LLM interface to a LLM and receiving a response thereto; and providing the response to the chat client as a response to the user query after validating the response, wherein the category is one of a chat, an action for function requests related to app creation, build, and deployment, an image generation for app icon or splash image during app creation and setting, and a debugging for errors that occur when building or deploying apps.

2. The non-transitory computer-readable medium of claim 1, wherein the category is the action, wherein the service module is configured to receive parameter values corresponding to the function request related to app creation, setting, build, and deployment among the user queries, provide a result processed through the LLM as the response, and return as the response a JSON string required to run an app development API.

3. The non-transitory computer-readable medium of claim 1, wherein the category is the image generation, wherein the service module is configured to generate one or more of the app icons and splash images during app creation or setting, and return a URL or file related to the generated image as the response.

4. The non-transitory computer-readable medium of claim 1, wherein the category is the debugging,
wherein the service module is configured to receive error logs that occur during app build or deployment as a result of the user query, or is called through a button provided when an error occurs on a build screen or a deployment screen, and provide database or Internet search results for the error log as the response.

5. The non-transitory computer-readable medium of claim 1, further comprising transmitting, by the app manager, a request to the app builder to apply or run the app based on the response.

6. An AI (Artificial intelligence)-based app build and deployment support server for providing AI-based support service to an app build and deployment system having an app builder that is configured to perform app creation, build, and deployment and an app manager that is configured to manage and control the app builder, comprising:
an API gateway, configured to receive API requests for a user query entered from a chat clients through a web interface provided by the app manager, to create a context by combining a context information retrieved by classifying the user query into a corresponding one of a plurality of categories, and execute individual services;
a context service module, configured to retrieve the context information, which is data to be added as the context, from a database according to a categorized user query;
an individual service module, configured to generate a LLM (large language model) prompt by adding the user query and the context for the user query generated by combining the user query and the context information to a service-specific prompt provided corresponding to the individual service; and
an LLM interface, configured to query a LLM with the LLM prompt and receive a response thereto,
wherein the API gateway is configured to validate the response and then to provide it to the chat client as a response to the user query,
wherein the individual service module comprises at least one of:
a chat service module, configured to perform a general chat function;
an action service module, configured to process a request for functions related to app creation, setting, build, and deployment among the user queries;
an image service module, configured to generate at least one of an app icon and a splash image during app creation or setting; and
a debugging service module that is called by inputting an error log that occurs during app build or deployment or by inputting a button provided when an error occurs on a build screen or a deployment screen.

7. The AI-based app build and deployment support server of claim 6, wherein the category is the image generation and the individual service module is the image service module,
wherein the image service module is configured to return a URL or file related to the generated image as the response.

8. The AI-based app build and deployment support server of claim 6, wherein the category is the debugging and the individual service module is the debugging service module,
wherein the debugging service module is configured to provide database or Internet search results for the error log as the response.

9. The AI-based app build and deployment support server of claim 6, wherein the app manager is configured to transmit a request to the app builder to apply or run the app based on the response, and the app builder is configured to build or deploy app based on the request.

* * * * *